United States Patent [19]

du Quesne

[11] 4,267,867

[45] May 19, 1981

[54] DEVICE FOR FIXING A WHEEL TO AN APPARATUS FOR FITTING AND REMOVING TIRES

[76] Inventor: Francis du Quesne, 138, Cleistraat, 2630 Aartselaar, Belgium

[21] Appl. No.: 66,277

[22] Filed: Aug. 13, 1979

[30] Foreign Application Priority Data

Sep. 1, 1978 [BE] Belgium ............................ 57248

[51] Int. Cl.³ ........................................... B25H 5/00
[52] U.S. Cl. ................................. 157/17; 157/1.24
[58] Field of Search ................ 144/288 A; 157/1.24

[56] References Cited

U.S. PATENT DOCUMENTS

| | | | |
|---|---|---|---|
| 3,818,968 | 6/1974 | Hogg | 144/288 A |
| 3,823,757 | 7/1974 | Hogg | 144/288 A |
| 4,034,786 | 7/1977 | Feldmann | 157/1.24 |
| 4,093,006 | 6/1978 | Hessels | 144/288 A |

*Primary Examiner*—W. D. Bray
*Attorney, Agent, or Firm*—William A. Drucker

[57] ABSTRACT

The present device is for fixing a wheel upon a turntable which is rotatingly driven below the tools of a device for fitting and removing a vehicle tire from the wheel. Means are provided to move the jaws along radial arms fixed on the turntable and to drive this table in rotary motion.

6 Claims, 3 Drawing Figures

DEVICE FOR FIXING A WHEEL TO AN APPARATUS FOR FITTING AND REMOVING TIRES

DESCRIPTION

Devices are known which are provided with a common mechanism for moving gripper-jaws and for driving the turntable of the device in rotary motion. The latter might be provided for instance for this purpose with a vertical shaft bearing a conical gear, meshing with several conical pinions, each fitted on a threaded shaft, along which aforesaid gripping-jaws can be moved axially. Other devices are known which comprise a vertical shaft carrying a straight gear, meshing with straight pinions, each of which is fitted on a shaft which is parallel to the aforementioned shaft and upon each of which is attached an arm with a gripping-jaw. Further devices are known which are provided with a vertical shaft, with a head with several radial arms upon which are fitted mobile jaws, with a turnplate capable of rotating around aforesaid shaft, with a hinged link-rod between the turnplate and each of the mobile jaws, so as to move the latter along aforesaid radial arms for fixing the wheel in this manner, as well as with means for angularly moving aforesaid turnplate.

These devices do however have the disadvantage of being costly to build. A further disadvantage being that the fitting of the various parts of such a device takes rather a long time.

In order to eliminate these disadvantages, the known device described last is, according to the invention, fitted with a means located between the rotary shaft, the head with several arms and the turnplate, means which can rotate and be varied in height with respect to these elements, subsequent to the rotation of the shaft, and producing an angular movement of the plate with respect to the head, the movement of the jaws and subsequently the rotation of the head with several arms and jaws between which the wheel is fixed.

Merely as an example, and without the slightest restrictive intention, a more detailed description is given hereinafter of a preferred form of embodiment of the device according to the invention, with reference to the appended drawings in which.

Figure 1:
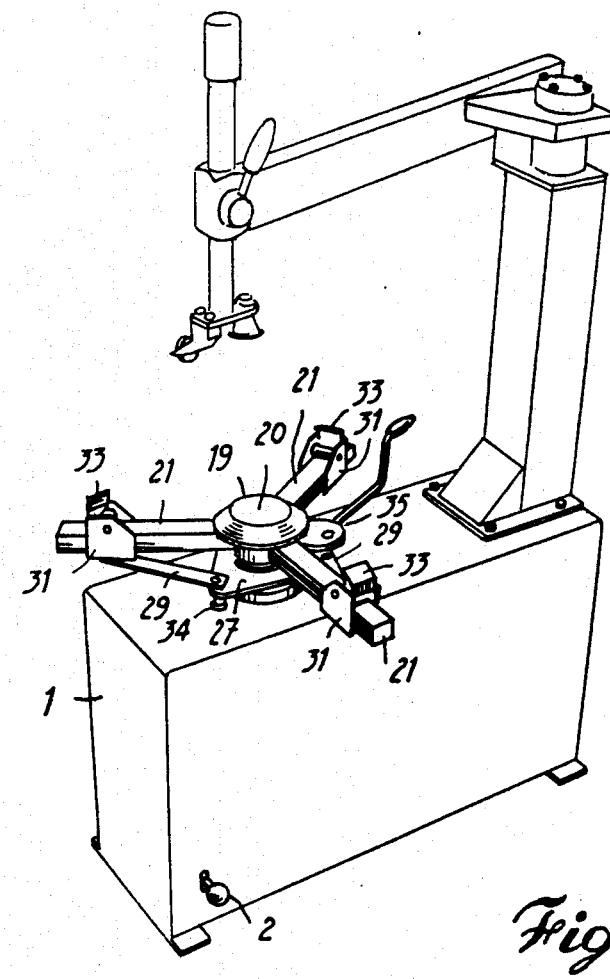
FIG. 1 shows a perspective view of an apparatus for fitting and removing tires, provided with the device according to the invention.
Figure 2:
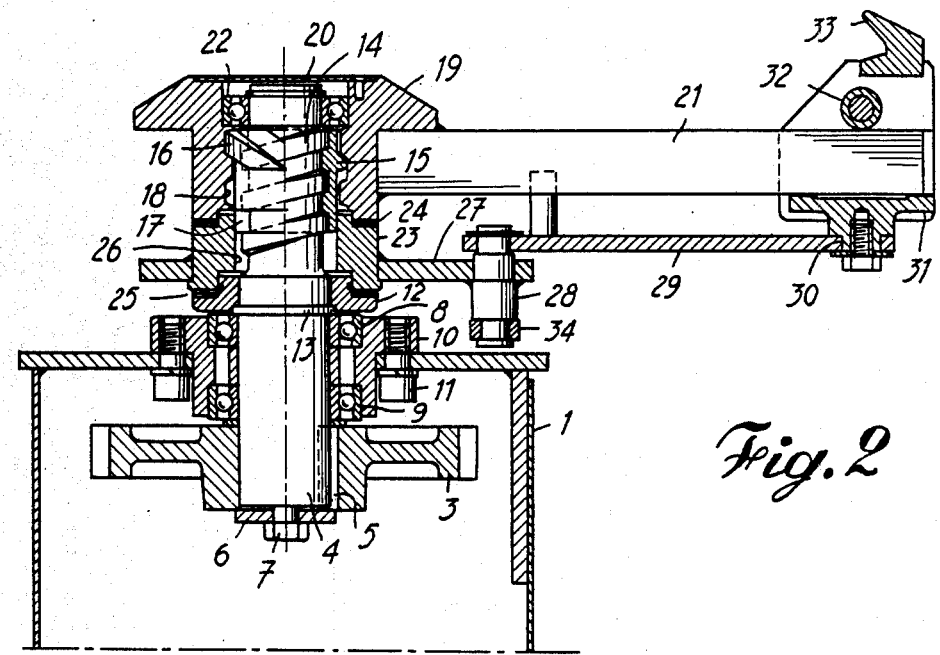
FIG. 2 is a longitudinal section of the device according to the invention.
Figure 3:
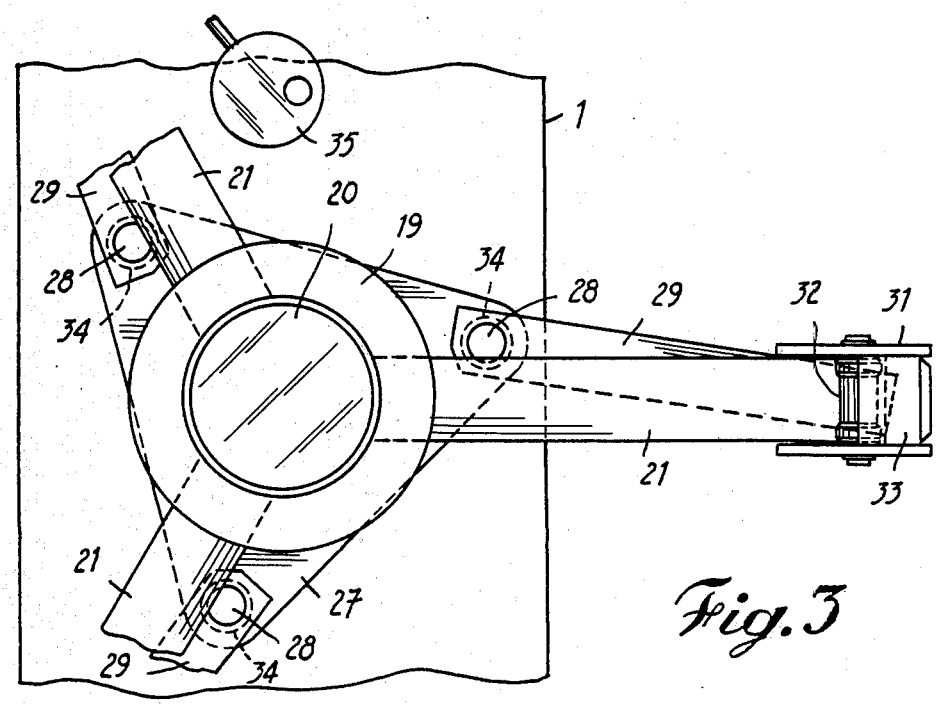
FIG. 3 shows a plan view thereof.

This device comprises a casin 1 in which is fitted an electric motor (not shown) which is capable of rotating in both directions, according to the position in which the pedal 2 is being pushed. By means of a reduction gear (not shown), the motor drives a gear 3 which is fitted on a shaft 4 by means of a key 5, a washer 6 and a nut 7. This shaft 4, which can be driven in rotation, is journalled in two ball bearings 8-9 located in a flange 10 made integral with casing 1 by means of bolts 11. on aforesaid shaft 4, there is force-fitted a tightly fitting bushing 12 which rests against a shoulder 13 of shaft 4. The upper portion of shaft 4 is provide with a right-hand trapezoidal screw thread 14. This threaded portion is screwed in a sleeve 15 which, on the outside and close to its upper end is provided with a short and steep left-hand thread 16, with several inlets. At the bottom this sleeve displays a portion 17 with square cross-section. The screw-thread 16 of sleeve 15 fits in the internally threaded portion 18 of head 19, the assembly being covered by a removable cover plate 20. Radial arms 21 are welded to head 19. Between the upper end of shaft 4 and head 19, a ball bearing 22 has been provided. A collar 23 is fitted between head 19 and bushing 12, whilst frictional discs respectively 24 and 25 are provided between these elements. Aforesaid collar 23 comprises a square opening 26 in which fits the square portion 17 of sleeve 15, whilst remaining free to move up and down. Aforesaid collar 23 is welded in a triangular plate 27, which is provided at its apices with pivot pins 28. Upon each of these pivot pins, there is pivoted a link-rod 29 which is also pivotingly attached to the pivot pin 30 of a clevis 31 which can move along the arm 21 with which it is associated. A guide roller 32 provided in each clevis 31 assures the easy movement and proper guiding of this clevis along its corresponding arm 21. Each clevis carries one of the gripping jaws 33 between which the wheel is clamped. A small cylindrical stopping block 34 is provided at the lower end of each pivot pin 28. These small stopping blocs cooperate with a stop 35 which can be placed along the circular path of the small stopping blocks 34, so as to prevent further rotation of the triangular plate 27.

In order to fix a wheel between the jaws 33 of the device for the purpose of fitting or removing a tire, the wheel is laid on arms 21 and between jaws 33, after which pedal 2 is depressed. This starts the motor (not shown), thus driving gear 3 and shaft 4 in rotary motion. Due to the fact that the wheel which rests upon arms 21 maintains these arms as well as head 19 stationary, the shaft 4 and its threaded portion 14 drive sleeve 15 which starts to rotate and is lowered in head 19, so that the square portion 17 of sleeve 15, which is located in the square opening 26 of collar 23, drives the collar and the plate 27 in rotary motion, and such due to the short and steep left-hand thread 16 of sleeve 15. A pull is consequently exerted on link-rods 29, so that the clevises 31 with their jaws 33 are moved along arms 21 towards the wheel. As soon as the jaws grip the wheel, plate 27 can no longer rotate, so that sleeve 15 starts to tighten head 19, collar 23, bushing 12 and the friction discs 24-25 firmly against each other, thus locking the jaws 33 against the wheel and maintaining the latter firmly clamped, after which head 19, arms 21 with the jaws 33, plate 27 with the link-rods 29 as well as the fixed wheel start rotating under the tools for fitting or removing a tire.

In order to free the wheel, stop 35 is swivelled around until it locates along the path of rotation of the small stopping blocks 34, so that the assembly can no longer rotate, after which pedal 2 is operated so as to make the motor and shaft 4 rotate in the opposite direction to that by means of which the jaws are moved so as to come closer together. Consequently, whilst moving upward, sleeve 15 rotates in the threaded portion 18 of head 19, which eliminates the tightening between head 19, collar 23, bushing 12 and the friction discs 24-25. By this rotating movement of sleeve 15, collar 23 and plate 27 are driven in opposite rotation, which pushes back link-rods 29 thus moving clevises 31 away from each other, so that the gripping jaws 33 move clear of the wheel.

It is perfectly obvious, that the dimensions and the relative arrangement of the parts described above may differ and be replaced by others which fulfill the same purpose, providing this remains within the scope of the present invention, as defined in the appended claims.

I claim:

1. A device, for securing a wheel on an apparatus for fitting and removal of automobile tires, comprising:
   (i) a support structure,
   (ii) a drive shaft journalled in said support structure for rotation,
   (iii) a head spaced about said shaft and having a plurality of arms,
   (iv) a plurality of gripping jaws carried each on a respective one of said arms and movable radially towards and away from the head,
   (v) a driven member spaced about said shaft,
   (vi) a plurality of link means each connecting said driven member with a respective one of said jaws such that relative rotation of said driven member with respect to said head causes radial movement of said jaws,
   (vii) a drive member disposed about said shaft and between said shaft and said head, said drive member being coupled in axially movable manner to said shaft and to said head, said drive member being keyed for rotation with but axially movable relative to said driven member,
whereby, with a wheel disposed between said gripping jaws, rotation of said drive shaft relative to said head causes said drive member to be rotated with said drive shaft and thereby rotate said driven member relative to said head with radial inward movement of the gripping jaws to tighten against the wheel, whereafter further rotation of the drive shaft causes said drive member to shift said head axially and lock said head, drive member and driven member together to rotate in unison with said drive shaft.

2. A device, as claimed in claim 1, wherein said drive shaft has an external thread engaged in an internal thread of said drive member, and wherein said drive member has an external thread engaged in an internal thread of said head.

3. A device, as claimed in claim 2, wherein said internal and external threads of said drive member are of opposite hand.

4. A device, as claimed in claim 2, wherein said drive shaft carries a bushing, said driven member being located between said bushing and said head.

5. A device, as claimed in claim 4, comprising first friction means disposed between abutting surfaces of said bushing and of said driven member, and second friction means disposed between abutting surfaces of said driven member and of said head.

6. A device, as claimed in claim 1, wherein said arms are radial arms, said gripping jaws being movable along said arms by means of respective guide rollers.

* * * * *